United States Patent [19]

Flurry

[11] Patent Number: 5,684,968
[45] Date of Patent: Nov. 4, 1997

[54] METHOD AND APPARATUS FOR PROCESSING MULTIPLE IMAGES CONCURRENTLY

[75] Inventor: Gregory Alan Flurry, Austin, Tex.

[73] Assignee: International Business Machines Corporation, Armonk, N.Y.

[21] Appl. No.: 491,188

[22] Filed: Jun. 16, 1995

[51] Int. Cl.⁶ .................................................. G09G 5/00
[52] U.S. Cl. .............................. 395/340; 395/339
[58] Field of Search .................... 395/326, 329, 395/330, 333, 340, 348, 339, 115, 116, 133, 106, 328

[56] References Cited

U.S. PATENT DOCUMENTS

| | | | |
|---|---|---|---|
| 4,949,391 | 8/1990 | Faulkerson et al. | 382/56 |
| 5,124,688 | 6/1992 | Rumball . | |
| 5,243,447 | 9/1993 | Bodenkamp et al. . | |
| 5,289,295 | 2/1994 | Yumiba et al. . | |
| 5,333,260 | 7/1994 | Ulicheny . | |
| 5,333,262 | 7/1994 | Ulicheny . | |
| 5,404,442 | 4/1995 | Foster et al. | 395/159 |
| 5,442,456 | 8/1995 | Hansen | 358/342 |
| 5,475,812 | 12/1995 | Corona et al. | 395/158 |
| 5,493,638 | 2/1996 | Hooper et al. | 395/135 |
| 5,499,362 | 3/1996 | Kawai et al. | 395/109 |
| 5,528,263 | 6/1996 | Platzker et al. | 345/156 |
| 5,546,103 | 8/1996 | Rhodes et al. | 395/157 |

OTHER PUBLICATIONS

Custer, *Inside Windows NT*, Microsoft Press, Redmond, Washington, pp. 15-20 1993.

*Primary Examiner*—Raymond J. Bayerl
*Assistant Examiner*—Steven P. Sax
*Attorney, Agent, or Firm*—Volel Emile; Paul S. Drake

[57] ABSTRACT

A method and apparatus for displaying images including first receiving multiple frames of image data to be displayed in multiple windows, then storing in memory multiple frame pointers to the multiple frames of image data, each frame pointer indicating at least one of the received frames of image data, each frame pointer including a window identifier identifying which window is to display the indicated at least one frame of image data, and followed by processing each frame pointer for displaying on a display the indicated at least one frame of image data in the window identified by the window identifier.

22 Claims, 15 Drawing Sheets

1

METHOD AND APPARATUS FOR PROCESSING MULTIPLE IMAGES CONCURRENTLY

RELATED PATENT APPLICATIONS

Related patent applications include copending application U.S. Ser. No. 08/491,461 (IBM Docket No. AT9-95-044) filed Jun. 16, 1995 and entitled "Method and Apparatus for Integrating Video Capture and Monitor", hereby incorporated by reference.

TECHNICAL FIELD

The present invention relates generally to image processing and more specifically to processing multiple frames of image data to be displayed in multiple windows.

BACKGROUND ART

Various types of images may be displayed on computer screens for providing information or entertainment to a computer user. These images may include photographs or video images of real life, computer generated graphics, animation, etc. In each case, the images are digitized into digital image data for display. This digital image data is typically grouped into frames of image data for processing and display. For example, a photograph may be digitized into one or more frames of image data for processing. In addition, a video is typically a sequential set of frames of image data for rapid sequential display.

The prior art describes many methods and devices for the processing of images. These methods and devices include various techniques for the capture, generation, storage, retrieval, conversion, display of digitized images.

U.S. Pat. No. 5,243,447 is directed to a single frame buffer video display system for combining both video and graphics images. Wherein the typical prior art utilizes separate frame buffers for the storage of video and graphics images (see FIG. 1), this patent teaches an integrated display system that uses a single frame buffer for the storage of video and graphics image data of a single data type.

DISCLOSURE OF THE INVENTION

The present invention includes a method and apparatus for displaying images including first receiving multiple frames of image data to be displayed in multiple windows, then storing in memory multiple frame pointers to the multiple frames of image data, each frame pointer indicating at least one of the received frames of image data, each frame pointer including a window identifier identifying which window is to display the indicated at least one frame of image data, and followed by processing each frame pointer for displaying on a display the indicated at least one frame of image data in the window identified by the window identifier.

A further understanding of the nature and advantages of the present invention may be realized by reference to the remaining portions of the specification and the drawings.

BEST MODE FOR CARRYING OUT THE INVENTION

This disclosure describes an improved method and apparatus for supporting multiple users of graphics and video adapters. In the preferred embodiment, the hardware for graphics and video adapters includes a video processor that can do color space conversion, scaling and dithering to improve the performance of video playback. The present invention also supports the integration of video capture and monitoring of the captured video in a multi-user environment.

In the preferred embodiment, multiple applications may wish to play back video, which consists of a number of sequential images to be played in a proper order. The video may be stored on some high capacity medium such as a hard disk or a CD-ROM, or may come from a network (e.g. for video conferencing). The images in the video may or may not be compressed. To play the video and leverage the video processor, an application may first be given a window identifier. This will typically come from a window manager application (like X Windows) that has opened the window channel of the invention (see FIG. 5). The application may then open the display channel of the invention, and prepare the device driver for displaying images using an 'image prepare' command (see FIG. 10). The application can then decompress each image of the video as necessary, and send each decompressed image to be scaled and converted to the pixel format of the graphics using an 'image display' command (see FIG. 11). Multiple applications can follow the same procedure. The present invention makes it possible for the hardware to service multiple applications.

In the preferred embodiment, a single application may wish to capture video. This means getting a number of sequential images for things like content creation or video conferencing. To simply capture video, the application opens the capture channel of the invention, and prepares the preferred embodiment of the invention for capture by using a 'capture prepare' command (see FIG. 12). This allows the application to set the size of the image to be captured. The application may use a 'capture control' command (see FIG. 13) to turn capture on and off. The application can get each image into system memory so that it can perform further processing on the image by using an 'acquire' command (see FIG. 14). This command will copy one image into system memory. Finally, if the application wishes to monitor (i.e., display) what is being captured, it may first get a window identifier (see above), and then can use a 'monitor' command (see FIG. 15) to turn monitoring on and off.

Figure 1:
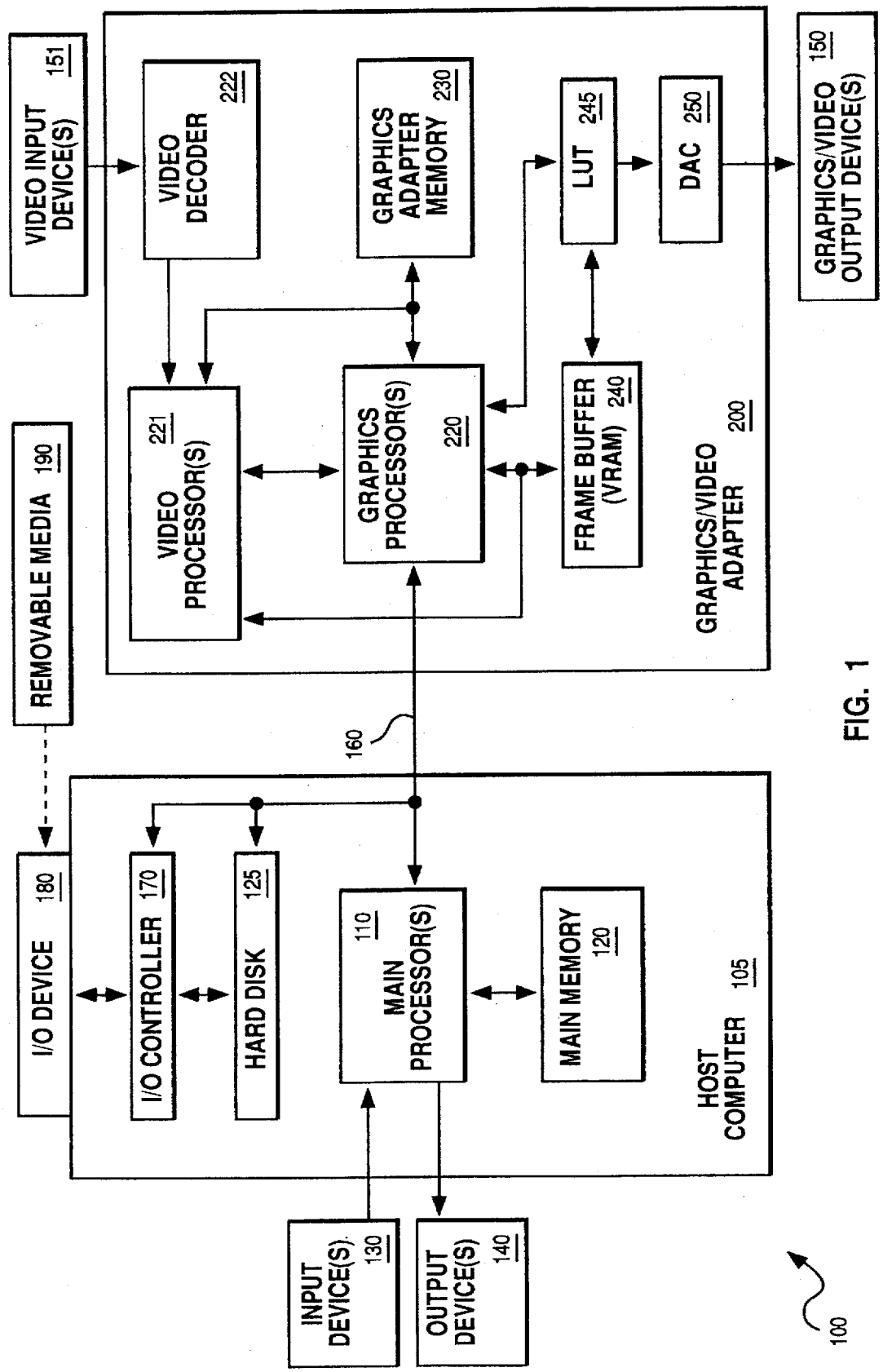
FIG. 1 is a block diagram of a typical digital computer utilized by a preferred embodiment of the invention.

FIG. 1 is a block diagram of a typical digital computer 100 utilized by a preferred embodiment of the invention. The computer includes host computer 105 which includes main processor(s) 110 coupled to a memory 120 and a hard disk 125 in computer box 105 with input device(s) 130 and output device(s) 140 attached. Main processor(s) 110 may include a single processor or multiple processors. Input device(s) 130 may include a keyboard, mouse, tablet or other types of input devices. Output device(s) 140 may include a text monitor, plotter or other types of output devices. Computer readable removable media 190, such as a magnetic diskette or a compact disc, may be inserted into an input/output device 180, such as a disk drive or a CD-ROM (compact disc-read only memory) drive. Data is read from or written to the removable media by the I/O device under the control of the I/O device controller 170. The I/O device controller communicates with the main processor across bus 160. Main memory 120, hard disk 125 and removable media 190 are all referred to as memory for storing data for processing by main processor(s) 110.

The host computer 105 and the main processor therein may also be coupled to a graphics/video output device(s) 150, such as a graphics display, and video input device(s) 151, such as a video camera or video cassette player, through a graphics/video adapter 200.

Graphics/video adapter 200 typically receives instructions regarding graphics and video from main processor 110 on bus 160. The graphics/video adapter then executes those instructions with graphics processor(s) 220 or video processor(s) 221 coupled to a graphics adapter memory 230. The graphics and video processors in the graphics adapter then execute those instructions and update frame buffer(s) 240 (also known as video random access memory or VRAM) and video look up table (LUT) 245 based on those instructions. Graphic processor(s) 220 may also include specialized rendering hardware for rendering specific types of primitives to be rendered. Video processor(s) include specialized hardware for the scaling and color space conversion of video images. A video decoder 222 may also be used to perform initial decoding (e.g. analog to digital) of incoming video data.

In the preferred embodiment, frame buffer(s) 240 includes a visible and an invisible portion (shown in more detail with reference to FIG. 4 below). In the visible portion, frame buffer(s) 240 includes an index value for every pixel to be displayed on the graphics output device. The index value read from the frame buffer is used to read LUT 245 for the actual color to be displayed. A DAC (digital-to-analog converter) 250 converts the digital data stored in the LUT into RGB signals to be provided to the graphics display 150, thereby rendering the desired graphics output from the main processor.

Figure 2:
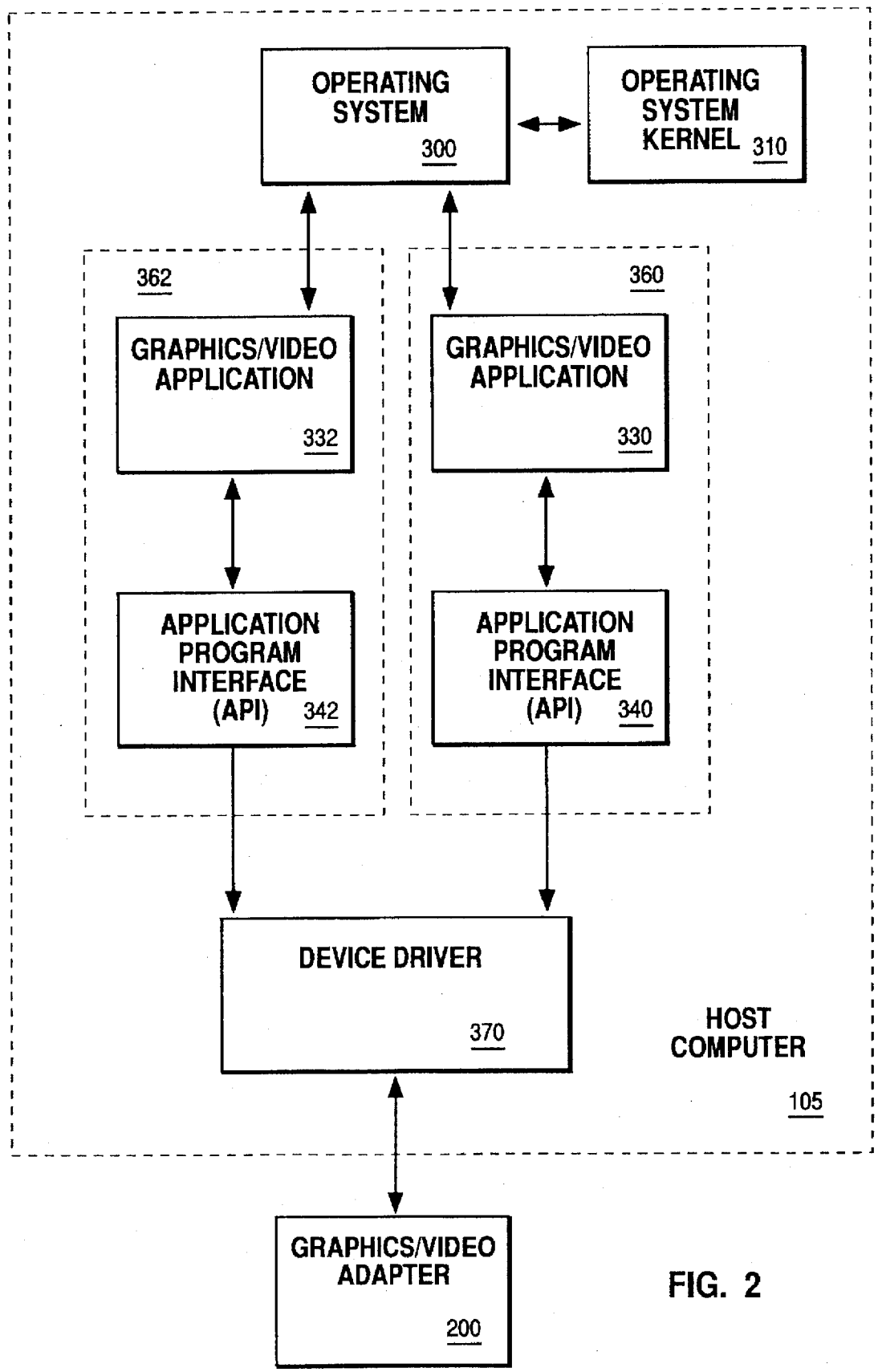
FIG. 2 is a block diagram illustrating the layers of code typically utilized by the host computer and graphics/video adapter to perform graphics and video functions.

FIG. 2 is a block diagram illustrating the layers of code typically utilized by the host computer and graphics/video adapter to perform graphics and video functions. An operating system 300 such as UNIX provides the primary control of the host computer 105. Coupled to the operating system is an operating system kernel 310 which provides the hardware intensive tasks for the operating system. Running on the operating system 300 are graphics and video applications 330 and 332. These applications may desire to play compressed video or capture video from a VCR, as described above. Graphics/video applications 330 and 332 are coupled to graphics and video application APIs (application program interfaces) 340 and 342, respectively. The API provides many of the computationally intensive tasks for the application and provides an interface between the application software and software closer to the graphics/video adapter 200, such as a device driver 370. In UNIX, the graphics API could be the X Windows library Xlib, and the video API could be the AIX Ultimedia Services.

The graphics/video application and APIs are considered by the operating system and the device driver to be a single process. That is, graphics/video applications 330 and 332 and APIs 340 and 342 are considered by operating system 300 and device driver 370 to be processes 360 and 362, respectively. The processes are identified by the operating system and the device driver by a process identifier (PID) that is assigned to the process by the operating system kernel. Processes 360 and 362 may use the same code that is being executed twice simultaneously, such as two executions of a program in two separate windows. The PID is used to distinguish the separate executions of the same code.

The device driver 370 is a graphics/video specific extension of the operating system kernel 310. The device driver communicates directly with the graphics/video adapter 200. For video applications, the device driver 370 sends application commands to the graphics/video adapter 200, returns status from the adapter to the application, and moves image data between the application's main memory 120 and the adapter VRAM 240. The device driver can move data between main memory and VRAM either using programmed I/O (PIO) or direct memory access (DMA), depending on the specific implementation of the graphics/video adapter 200.

Figure 3:
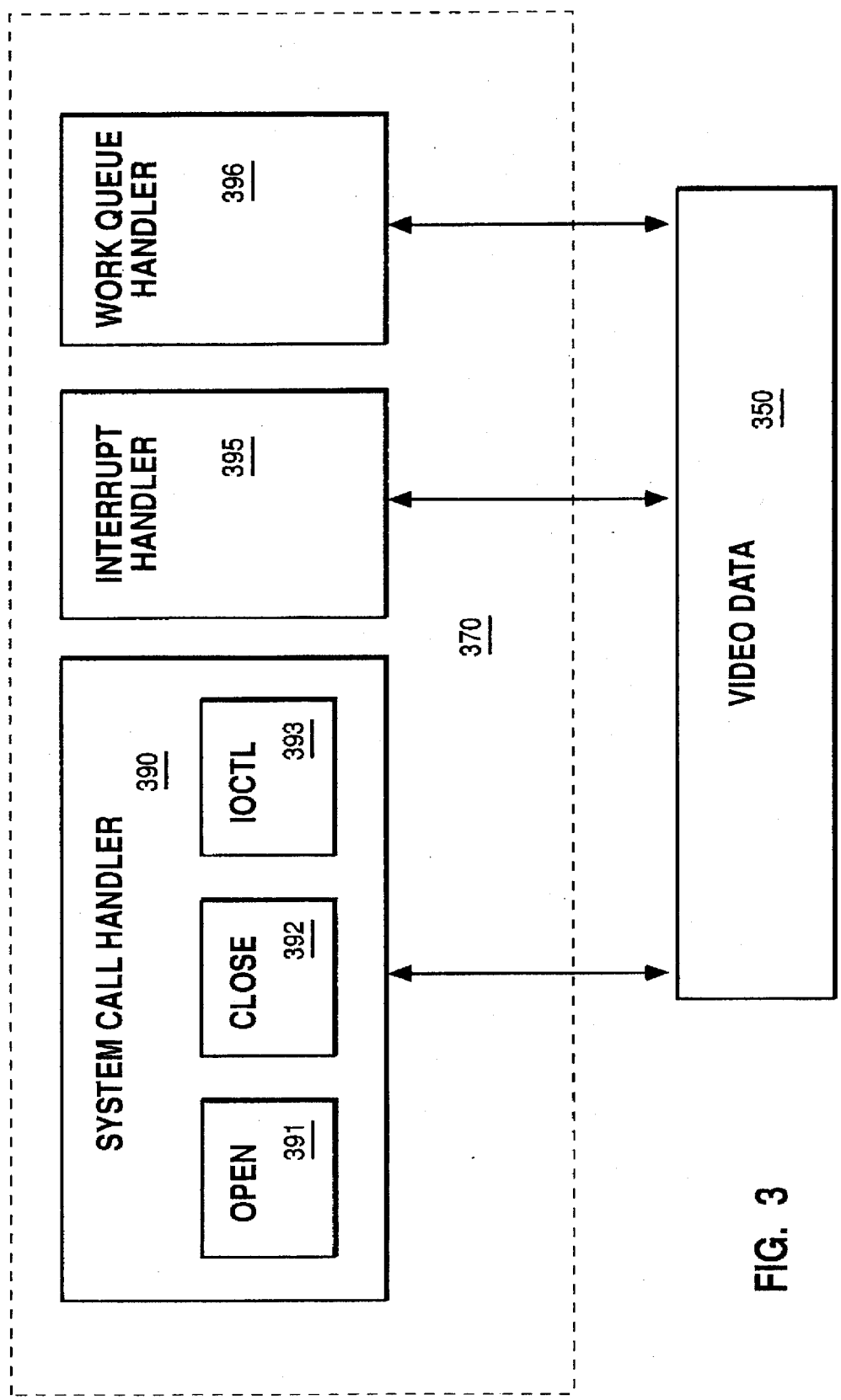
FIG. 3 is a block diagram illustrating the detailed structure of the device driver 370.

FIG. 3 is a block diagram illustrating the detailed structure of the device driver 370. The device driver includes three main components. The system call handler 390 is the part of the device driver that runs as part of an application process 360, 362. The system call handler has operating system kernel privileges when the application 330 or the API 340 calls the device driver to provide some service. The system call handler consists of three major subcomponents, an open handler 391, a close handler 392 and an IOCTL handler 393. The open handler 391 is responsible for initializing the entire device driver (described in detail in FIG. 5). The close handler 392 is responsible for terminating the entire device driver (described in FIG. 6). The I/O control (IOCTL) handler 393 is responsible for various application activities (described in FIG. 7).

The device driver 370 of the preferred embodiment is a multiplexed device driver. This means that it supports the concept of channels. An application must open a particular channel to get access to certain functions of the device driver. Other functions of the device driver are not available to that application. The preferred embodiment supports three channels (see FIGS. 5, 6, 7). The window channel permits an application to define and delete windows. The device driver allows only one application (typically the X server in UNIX) to open this channel so there will be no conflicts regarding window definitions. The capture channel permits an application to capture images using the video processor 221 and the video decoder 222, acquire the images, and monitor the captured images. Only one application can open the capture channel in the preferred embodiment because of the overhead when sharing the video decoder 222 and capture portion of the video processor 221. The display channel permits an application to display images using the video processor 221. Many applications can open a display channel with this invention.

The interrupt handler 395 is invoked by the operating system kernel 310 in response to interrupts generated by the graphics/video adapter 200. Probably the most important interrupt is generated by the video processor 221 after it completes the capture of an image. The interrupt handler is described in FIG. 16.

Figure 17:
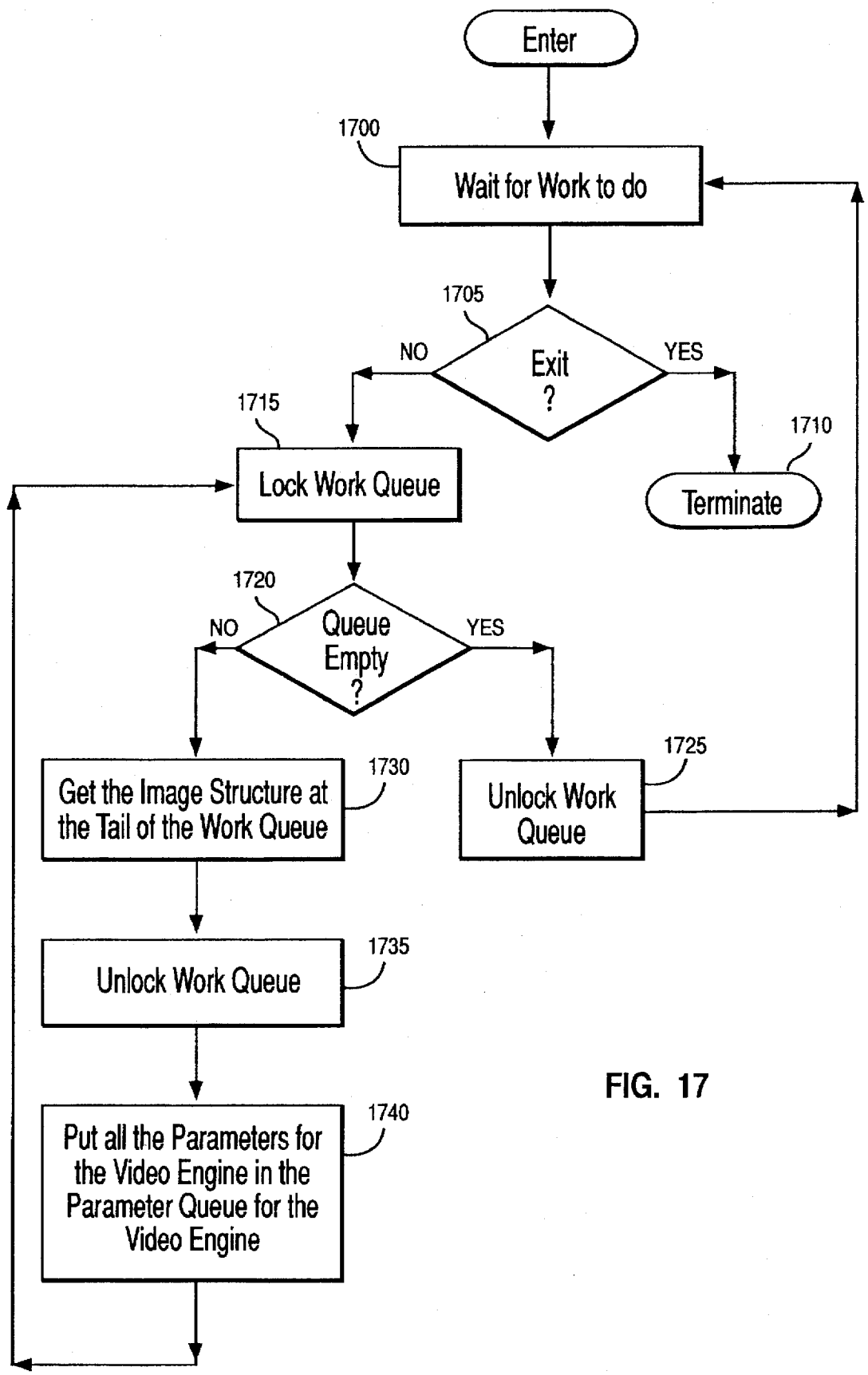
FIG. 17 is a flow diagram illustrating operation of the work queue handler 396.

The work queue handler 396 is a kernel process (a process not associated with any application) that runs independently of the system call handler and the interrupt handler and any application using the device driver (described in FIG. 17). It is responsible for commanding the video processor 221 to perform scaling and conversion of the images to be displayed, either those displayed directly by applications or the captured image being monitored.

The components of the device driver 390, 395, 396 all share a command set of video data 350, stored in main memory 120. The video data is described in detail in FIG. 4 below.

Figure 4:
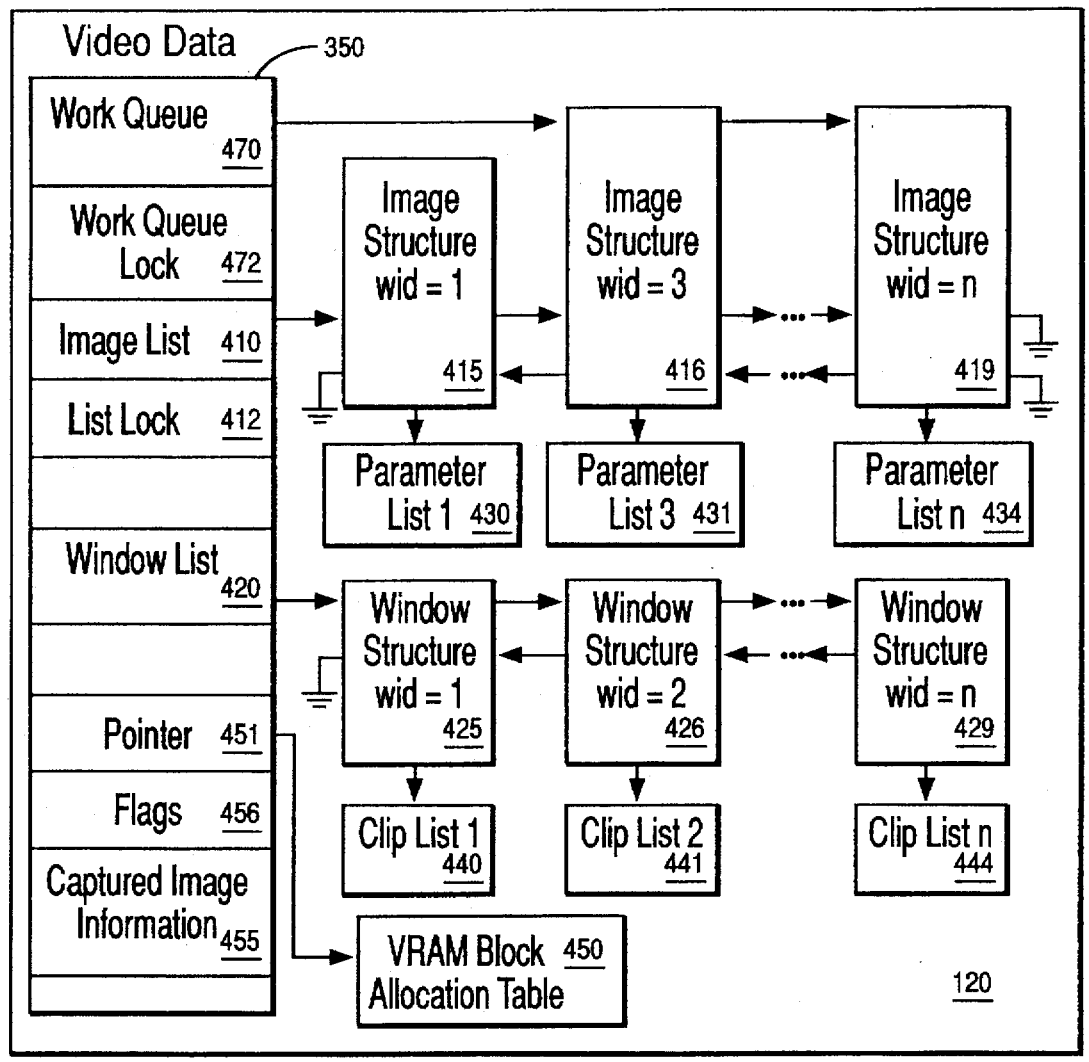
FIG. 4 is a block diagram of data structures used by a preferred embodiment of the invention and stored in main memory 120 and frame buffer 240.
Figure 4:
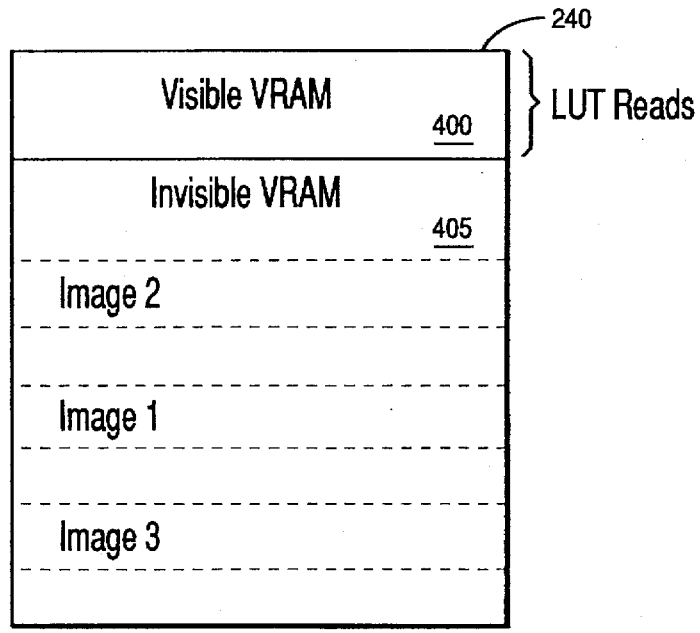

FIG. 4 is a block diagram of data structures used by a preferred embodiment of the invention and stored in main memory 120 and frame buffer 240.

The frame buffer 240, also known as video RAM or VRAM includes both a visible portion 400 and invisible portion 405. The visible portion 400 of the VRAM includes pixel information for each of the display pixels. It is the visible portion that the LUT 245 reads for converting the digital data stored in the VRAM for display. The visible portion 400 may include additional planes of data for storing depth information, window identifiers or the like for each pixel to be displayed. The invisible portion 405 is used for the temporary storage of images. These images may be stored in a variety of formats and sizes. In addition, the images are available for scaling, conversion, or other operations. If being displayed, a large YUV image such as image 1 could be converted to RGB from YUV and scaled to fit the desired window by the video processor 221 and then the resulting converted and scaled image could be stored in the visible portion of VRAM 400 for display. If being captured by a video application 330, an image such as image 2 would be stored in invisible VRAM 405 by the video processor after being digitized by the video decoder 222, and then would be copied by the device driver 370 from invisible VRAM 405 to the host computer main memory 120 being used by the application. The invisible portion of the VRAM may also include additional planes for the storage of different types of image data or for the storage of other types of data corresponding to a stored image such as audio data.

Main memory 120 includes a data structure called video data 350 shared by all components of the device driver 370. Video data includes various linked lists and other information necessary for displaying and capturing images. In an environment with multiple graphics/video adapters 200, each adapter would utilize independent video data 350.

The video data 350 includes an image list 410 and a window list 420. These are doubly linked lists of image structures 415, 416, 419 or window structures 425, 426, 429. An image structure represents an image stored in invisible VRAM 405 that is to be displayed by the video processor 221. Each image structure includes a window identifier (wid) associating the image with a window in which the image will be displayed (the captured image is an exception, since it is not displayed), a pointer to the image location in invisible VRAM, and a pointer to a parameter list 430, 431, 434. A parameter list contains the information required by the video processor 221 to perform the required operations on the image, such as scaling and color space conversion.

A window structure 425, 426, 429 represents a window in which an image is to be displayed. Each window structure includes a window identifier (wid) that associates the window with the image to be displayed in the window, various information about the window, such as the location and size, and a pointer to a clip list 440, 441, 444. The clip list for a window represents the visible portion of the window as a list of rectangles. The typical video processor 221 can only deal with one rectangle at a time, and so the parameter list 430 for an image will contain parameters describing how to display a portion of the image for each rectangle in the clip list 440.

The video data 350 contains a list lock 412. This list lock is used with operating system kernel 310 lock/unlock functions to lock both the image and window lists. Locking the lists means that the locking component has exclusive access to the lists. This is necessary so only one application can manipulate the pointers in a list at one time, which guarantees list integrity. Unlocking the lists means that other components can now access the lists, but only after locking it themselves. When a device driver component tries to lock the lists, and the lists are already locked, the component is put to sleep by the kernel and is awakened when the list is unlocked.

The video data 350 also contains a work queue 470. The work queue is a singly linked list of image structures already in the image list 410. The work queue represents the images that need to be displayed by the work queue handler 396. As applications request that images be displayed, the device driver 370 links them at the head of the work queue. The work queue handler then removes the images from the tail of the work queue and sends the parameters in the parameter list 430 for the image to the video processor 221, which then displays the image according to the parameters.

The video data 350 contains a work queue lock 472. It performs a function identical to the list lock 412, except the work queue lock guarantees exclusive access to the work queue 470. Locking the work queue prevents another component from accessing the work queue so that the work queue integrity is maintained. Unlocking the work queue then allows other components to access the work queue.

Please note that the number of images does not have to equal the number of windows. There may be images, such as the captured image, that are not displayed in windows. There may be other data (e.g. audio) that has nothing to do with display or capture. In the latter case, the image structure 415 can be considered simply a reference to an area of invisible VRAM 405. Special identifiers are used for such cases so that there is no conflict with window identifiers used for images to be displayed.

The video data 350 also contains a pointer 451 to a VRAM block allocation table 450. The invisible VRAM 405 is logically partitioned into blocks roughly the size of a QCIF image (176 pixels×144 lines×2 bytes per pixel). The VRAM block allocation table contains an entry for each block in invisible VRAM. The size of the table depends on the size of the invisible VRAM. When a block is unallocated, it is marked as such with a special code. When the block is allocated to an image, it is marked with the window identifier of the image. Breaking the invisible VRAM into blocks makes the task of managing invisible VRAM allocation and deallocation much easier. It is also efficient, as image sizes tend to be similar, minimizing 'holes' in the allocation table, and in invisible VRAM. Additional captured image information 455 and various flags 456 may also be stored in video data 350.

Figure 5:
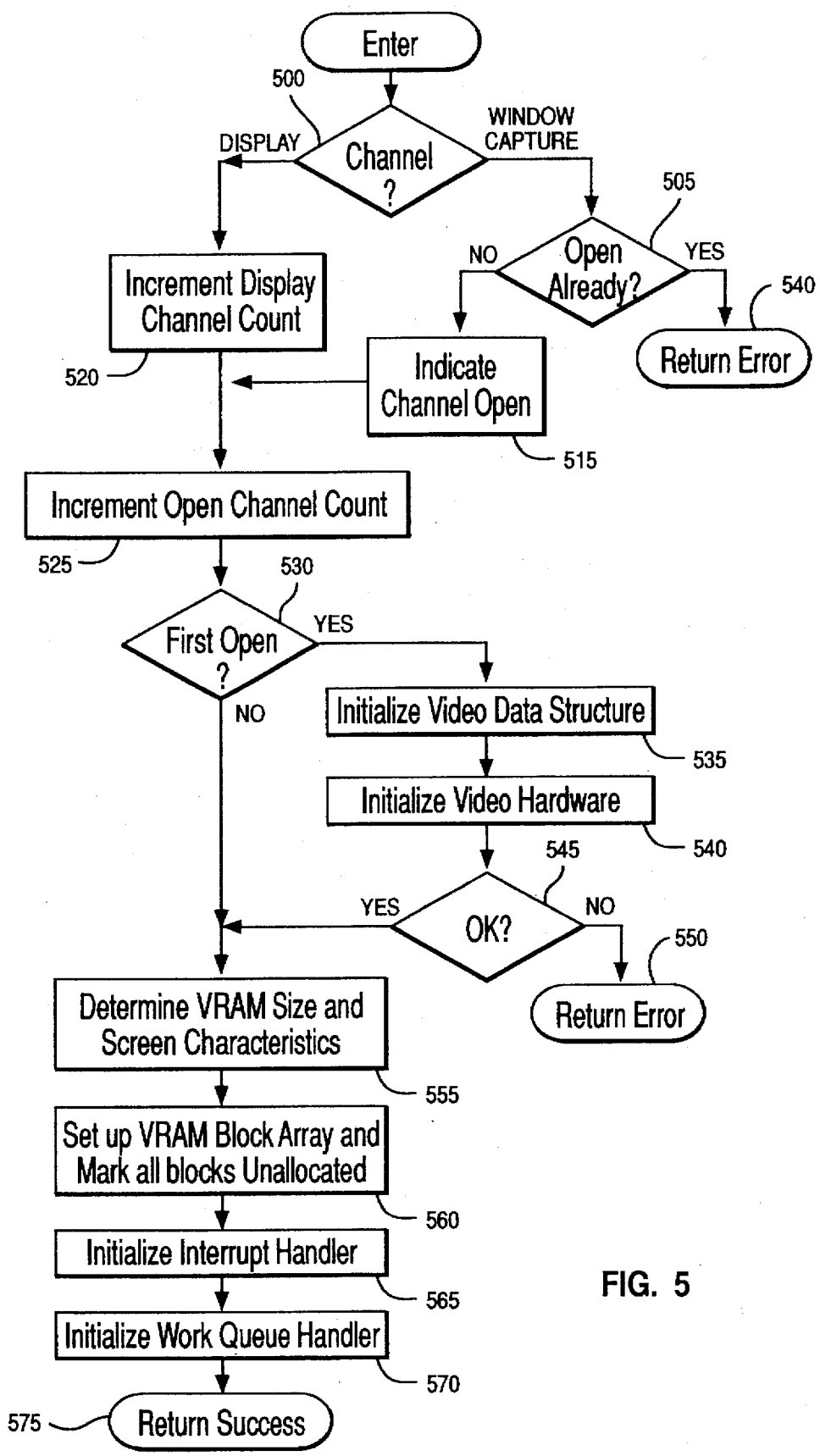
FIG. 5 is a flow diagram illustrating an open system call for opening the device driver 370.

FIG. 5 is a flow diagram illustrating an open system call for opening the device driver 370. The open system call handler gets called every time an application opens any of the three channels, window, capture, or display. In a first step 500 it is determined whether the open system call is for the window channel, the capture channel or the display channel. If the channel is a window or a capture, then in step 505 it is determined whether the channel is already opened. If the channel is already opened, then in step 510 an error code is returned, since these channels can only be opened once. If the window or capture channel is not already opened, then in step 515 a flag is set to indicate the channel is open. Processing then continues to step 525. If it is determined at step 500 that the open system call is for the display channel, then in step 520, the display channel count is incremented and processing continues to step 525.

In step 525, the total open channel count is incremented. This allows the device driver to determine when to terminate (after the last close). In step 530, it is determined whether this is the first opening of any channel (i.e., is the channel count equal to one). If yes, then in step 535, the video data 350 in system memory is initialized. Then in step 540, the video hardware is initialized. In step 545 it is determined whether or not step 540 completed successfully. If no, in step 545, then an error code is returned to operating system kernel 310, which will call the close system call handler 392 for the channel. If yes in step 545 or no in step 530, then processing continues to step 555.

In step 555 the screen characteristics and invisible VRAM 405 size are determined from information in the graphics processor 220 control registers. In step 560, the VRAM block allocation table 450 is set up, based on the invisible VRAM size, and all blocks are marked unallocated by storing a special code in each entry. In step 565 the interrupt handler is initialized by making the required calls to the operating system kernel 310. In step 570, the work queue handler, a kernel process, is initialized by making the required calls to the operating system kernel. In step 575 a successful code is returned to the operating system kernel, which returns an indication of success to the calling application.

Figure 6:
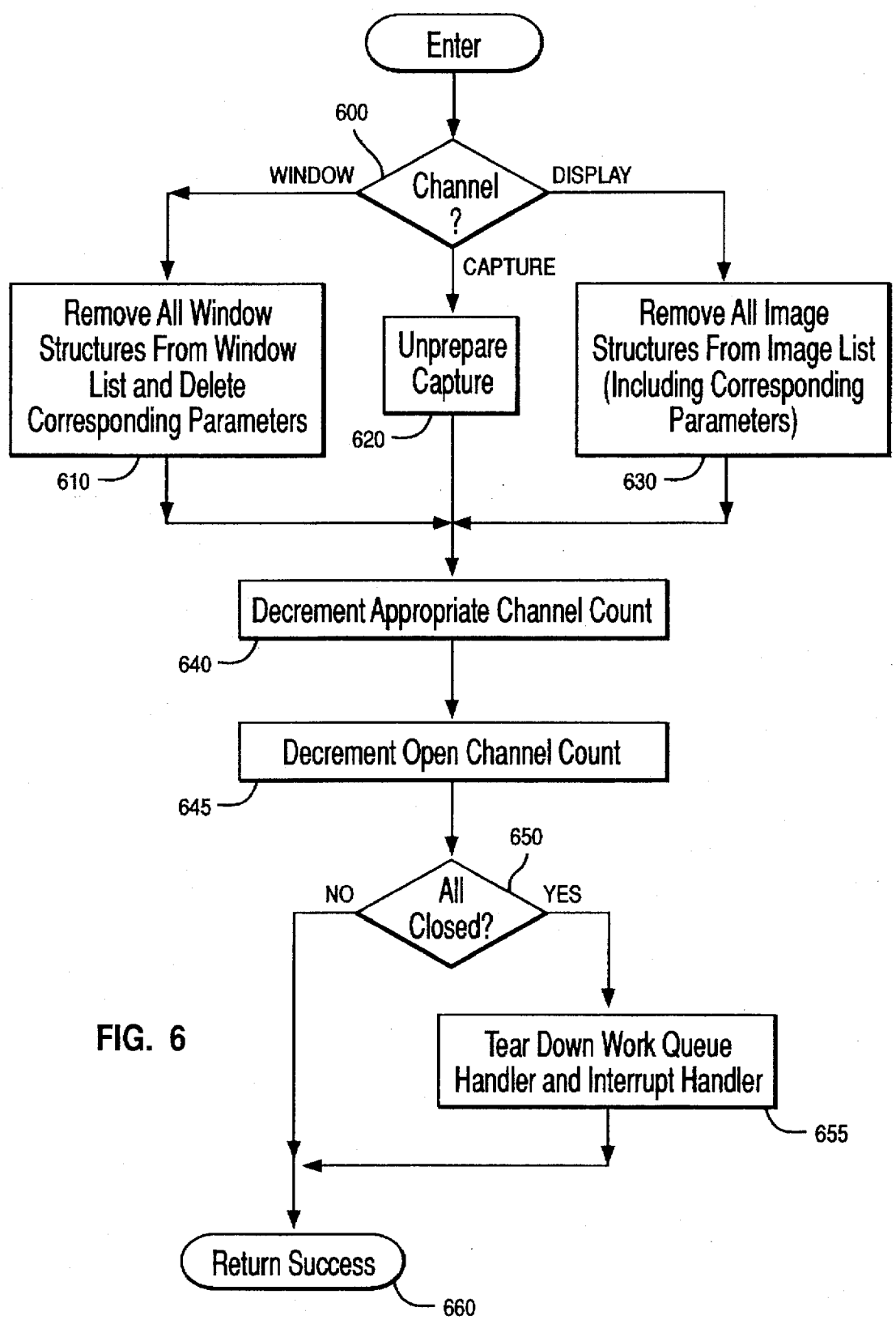
FIG. 6 is a flow diagram illustrating a close system call.

FIG. 6 is a flow diagram illustrating a close system call. In a first step 600, it is determined whether the channel being closed is the window, capture or display channel. If the window channel, then in step 610, all window structures are removed from the window list 400. To remove a window structure 425 from the window list, the window and image lists must first be locked. The work queue must then be locked. Any image corresponding to the window being removed is unlinked from the work queue. The work queue is then unlocked. The window structure is then unlinked from the window list. The lists are then unlocked. The parameter list 430 associated with an image being displayed in the window being removed is deleted. The clipping list 440 associated with the window is freed, and then the window structure itself is freed. Processing then continues as described below with reference to step 640. Once the window channel is closed, images can no longer be displayed, but images can be captured and acquired.

If the channel being closed is a display channel, then in step 630, all image structures created by the application closing the display channel are removed from the image list 410. To remove an image structure 415 from the image list, the lists are locked. The work queue must then be locked. The image structure is unlinked from the work queue, if it is in the work queue. The work queue is then unlocked. The image structure is unlinked from the image list, and the lists are then unlocked. The parameter list 430 for the image is freed. The VRAM blocks holding the image are marked unallocated in the VRAM block allocation table 470. The image structure 415 itself is freed. Processing then continues as described below with reference to step 640.

If it is determined in step 600 that the channel being closed is a capture channel, then in step 620 capture is unprepared. To unprepare capture, the device driver first turns off capture in the video processor 221 and the video decoder 222. If monitoring is on, it is turned off by setting the monitor flag off, and the image associated with monitoring is removed from the image list (see description of step 630). Finally, the VRAM blocks holding the captured image are marked unallocated. Processing then continues to step 640.

In step 640 the appropriate channel count (window, display, or capture) is decremented. In step 645 the open channel count is decremented. In step 650 it is determined whether all the open channels are now closed. If yes in step 650, then in step 655 the work queue handler 396 is told to terminate and the interrupt handler 395 is removed from the operating system kernel 310 list of interrupt handlers. If no in step 650 or upon completion of step 655 success is returned to the operating system kernel, which returns success to the application.

Figure 7:
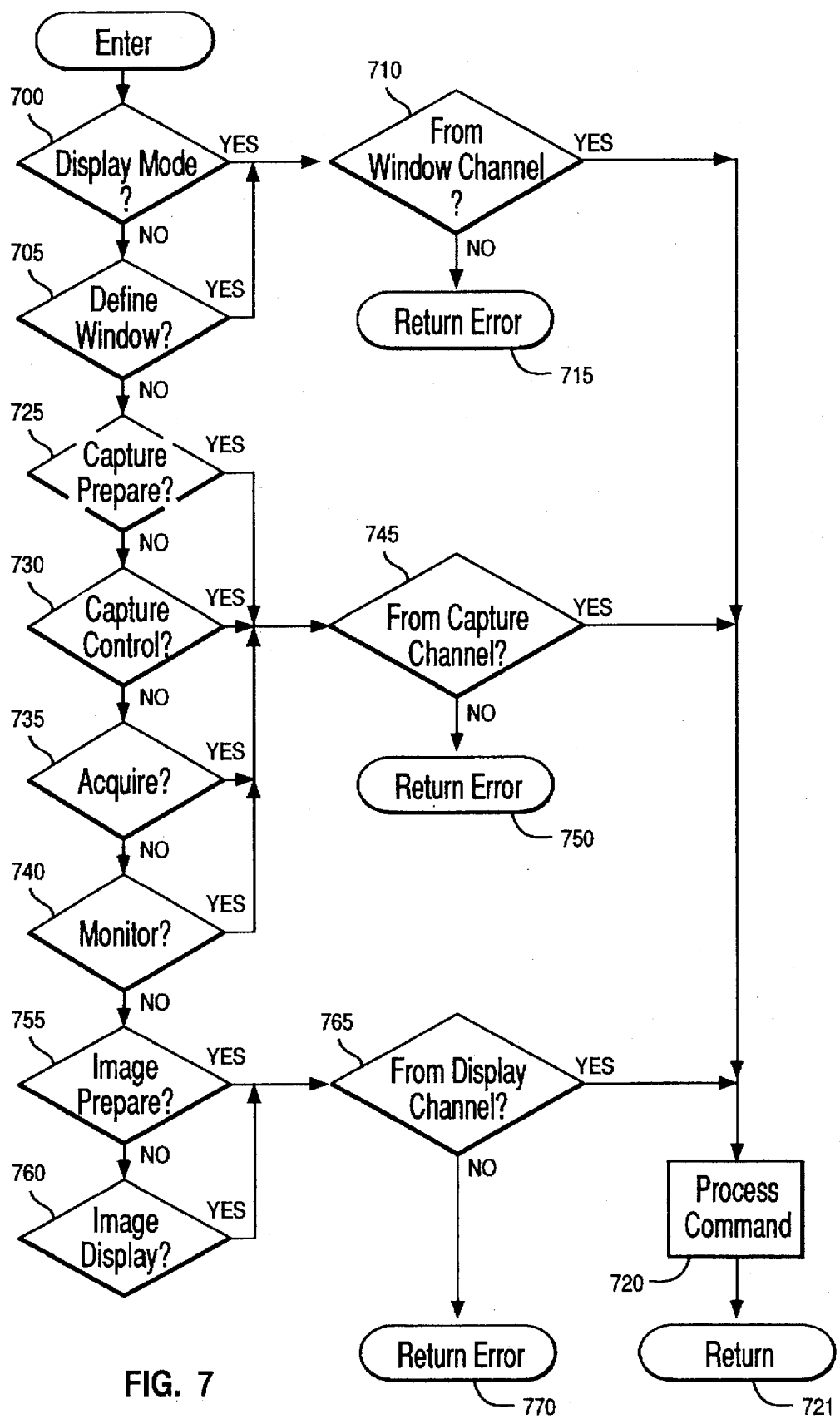
FIG. 7 is a flow diagram illustrating an I/O control system call.

FIG. 7 is a flow diagram illustrating the I/O control system call routine. In steps 700 and 705, it is determined whether the I/O control system call is a 'display mode' call or 'define window' call. If yes in either step, then in step 710, it is determined whether this system call is from a window channel. If no in step 710, then error code is returned in 715. If yes in step 710, then in step 720 the command is processed (see FIGS. 8 and 9) and the result of processing is returned in step 721.

In steps 725, 730, 735 and 740, it is determined whether the I/O control system call is a 'capture prepare,' 'capture control,' 'acquire' or 'monitor' command. If yes in any step, then, in step 745, it is determined whether this is from a capture channel. If not, then an error code is returned in step 750. If yes in step 745, then the command is processed as described above with reference to step 720 (see FIGS. 12, 13, 14, 15).

In steps 755 and 760 it is determined whether the I/O control system call is an 'image prepare' or 'image display' command. If yes in either step, then, in step 765, it is determined whether or not the call is from a display channel. If no in step 765, then an error code is returned in step 770. If yes in step 765, then the command is processed as described above with reference to step 720 (see FIGS. 10, 11).

Figure 8:
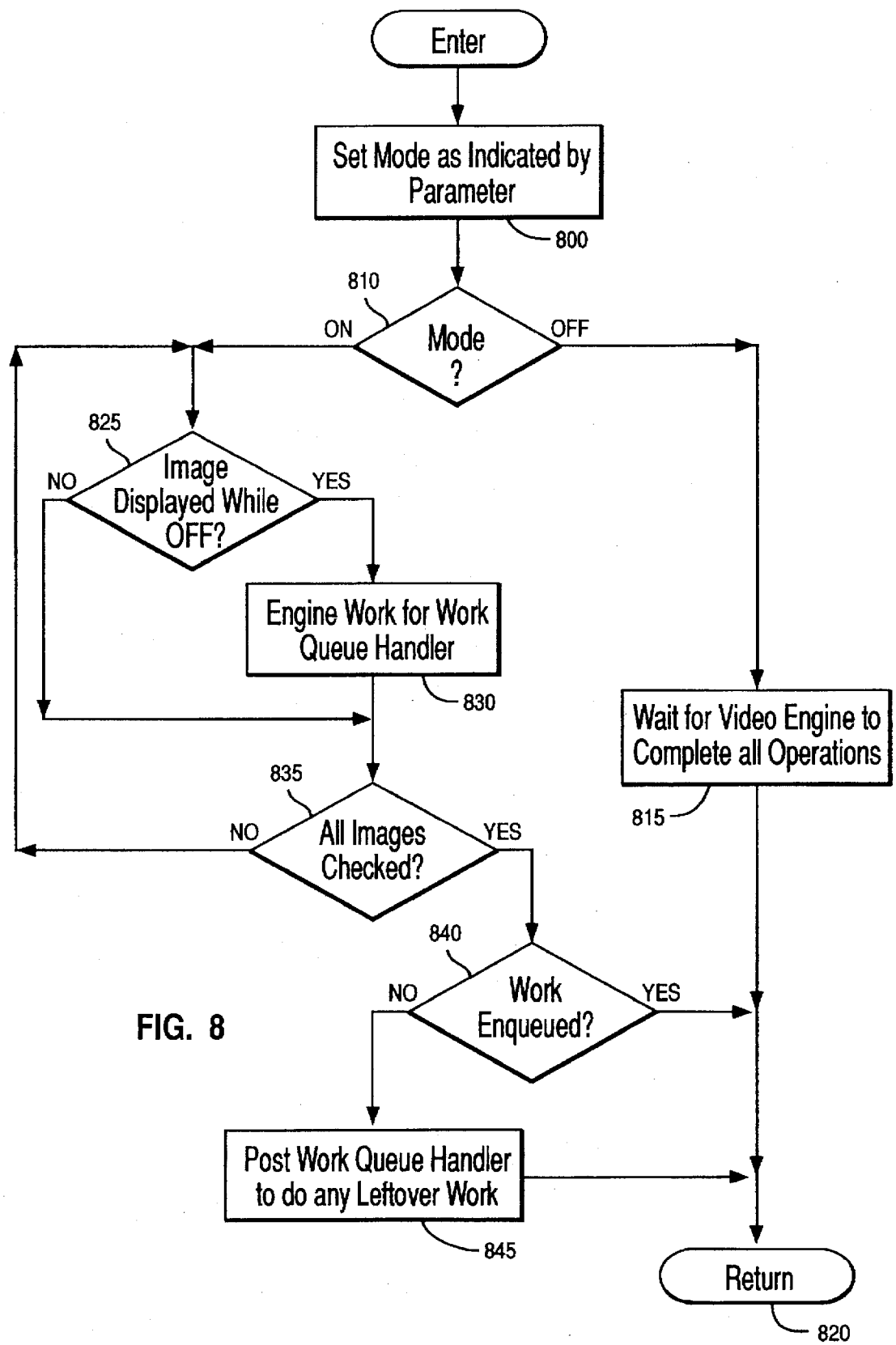
FIG. 8 is a flow diagram illustrating a 'display mode' command.

FIG. 8 is a flow diagram illustrating a 'display mode' command. The command has a single parameter indicating whether to set the display mode on or off. In a first step 800, the mode is set as indicated by the parameter. In step 810, it is determined whether or not the mode is off or on. If the mode is off, then in step 815 the system waits for the video processor 221 to complete all operations. This is needed so that the owner of the window channel can safely change the description of the windows without the video processor writing an image where is shouldn't. Then processing continues to step 820 for return. If the mode is determined in step 810 to be on, then in step 825, it is determined whether an application requested to display an image, using the 'image display' command, while the display mode was off. If yes, it is possible that the application will not issue the 'image display' command again, so in step 830 work is enqueued for the work queue handler 396. To enqueue work for the work queue handler, the work queue must be locked. The image structure 415 corresponding to the image to be displayed is linked into the work queue at the head of the work queue. Then the work queue handler is posted (this wakes up the work queue handler if it is sleeping waiting for work). Then the work queue is unlocked. Processing then continues to step 835 to determine whether all images have been checked. If no in step 835, then processing returns to step 825 described above. If all images have been checked, then step 840 determines whether any work has been enqueued. If not, then in step 845 the work queue handler is posted to handle any work left over from when the display mode was turned off. Processing then continues to step 820 for returning to the application.

Figure 9:
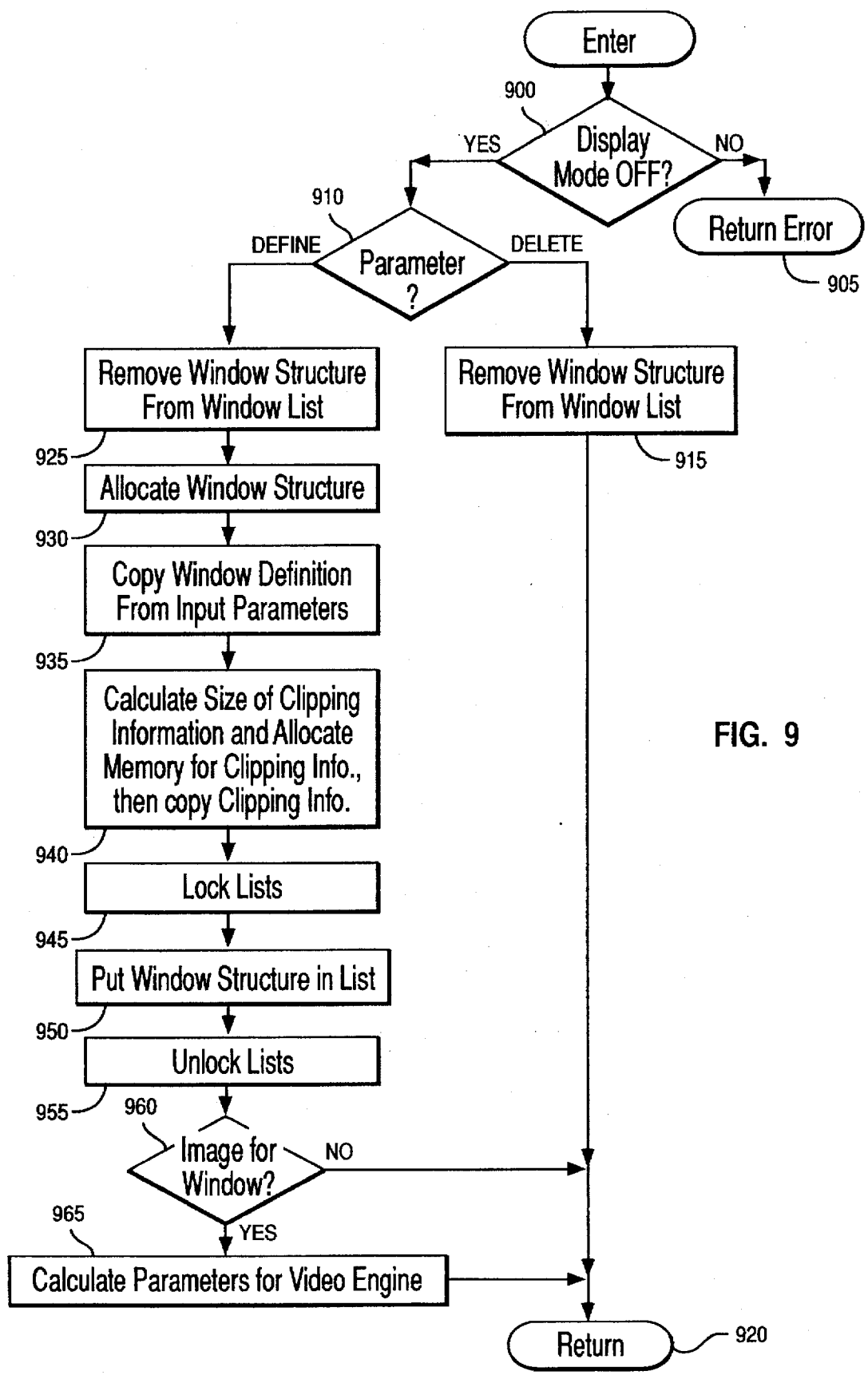
FIG. 9 is a flow diagram illustrating a 'define window' command.

FIG. 9 is a flow diagram illustrating the 'define window' command. The command has a parameter that indicates whether a window is being defined or deleted, a parameter that is the window identifier, and parameters that describe the window location, size and clipping information. In step 900 it is determined whether the display mode is off. If not, then an error code is returned, because defining a window when the mode is on will cause front of screen anomalies. If yes, then in step 910, it is determined whether the command is a delete or define command. If the command is a delete command, then in step 915, the window structure 440 identified by the window identifier is removed from the window list as described in step 610. Processing then continues to step 920 for return to the application.

In step 910 if it is determined that the command is a define command, then processing continues to step 925. In step 925, the window structure 425 identified by the window identifier is removed from the window list as described in step 610. In step 930, a new window structure 440 is allocated, and in 935 the window definition is copied from the input parameters. In step 940, the size of the clipping information is calculated, and clip list 440 is allocated and copied from the input parameters. In step 945, the lists are locked. In step 950, the window structure is then linked into the window list. In step 955, the lists are then unlocked. In step 960, it is determined whether an image has been associated with the window being defined by checking the window identifiers of the images in the image list. If not, then processing continues as described above with reference to step 920. If yes in step 960, then in step 965 the parameters required by the video processor 221 to display the image in the window are calculated for the video image. Step 965 processes each rectangle in the clip list 440. For each rectangle, memory is allocated to hold the parameters. The parameters are calculated (the exact nature of the parameters depends on the nature of the video processor). The parameters are linked into the parameter list 430 associated with the corresponding image structure 415.

Figure 10:
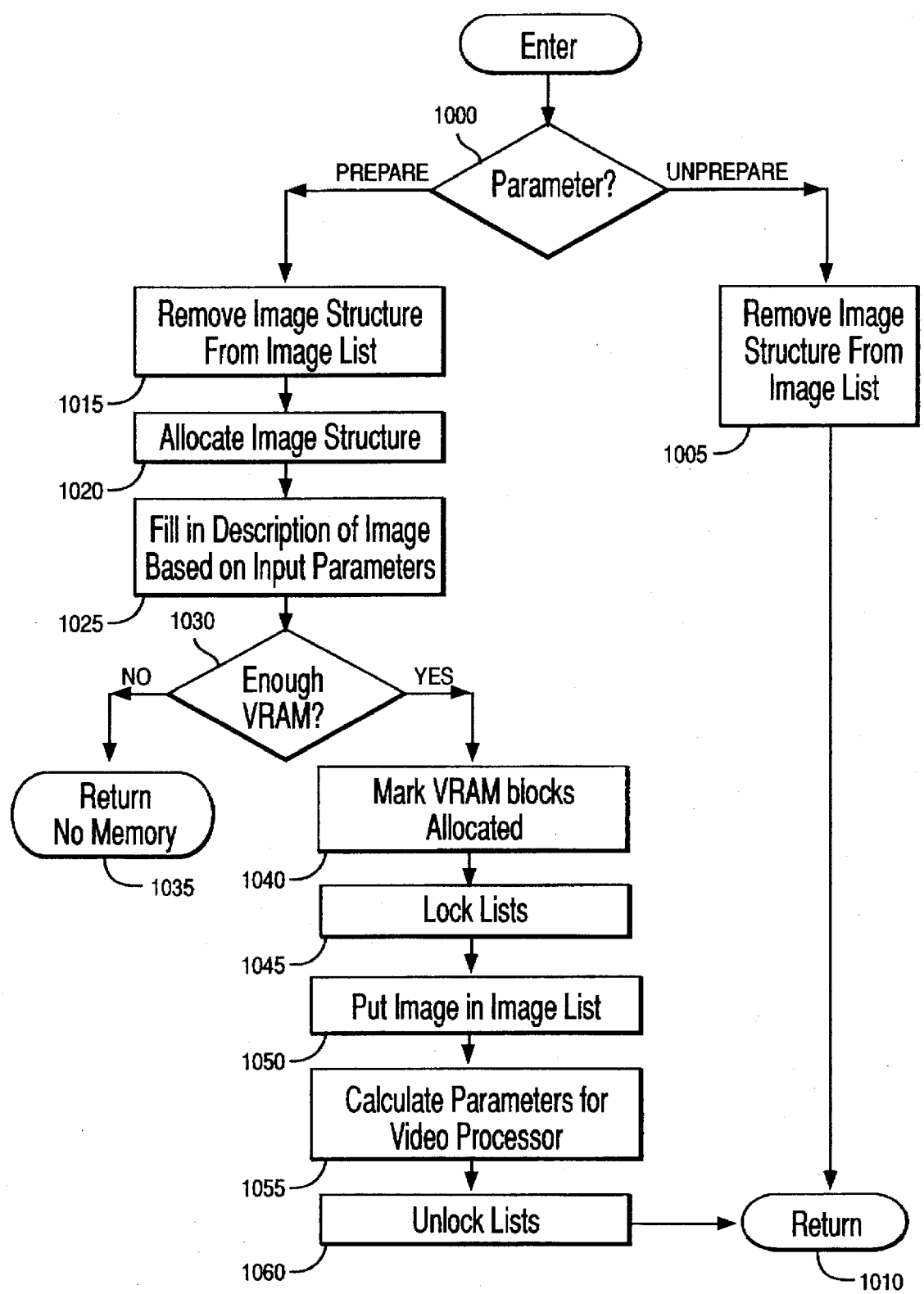
FIG. 10 is a flow diagram illustrating an 'image prepare' command.

FIG. 10 is a flow diagram illustrating the 'image prepare' command. The command has a parameter indicating whether to prepare an image or unprepare (delete) an image. It also has parameters describing the image (e.g., size, format), and a window identifier that associates the image with a particular window already defined using the 'define window' command (FIG. 9). In a first step 1000 it is determined whether the command is prepare or unprepare. If an unprepare command, then in step 1005 the image structure is removed from the image list, as described in step 630. Processing then continues to step 1010 for return to the application.

If in step 1000 it was determined that the command is a prepare command, then in step 1015 the image structure is removed from the image list, as described in step 630. In step 1020, the image structure 415 is allocated in memory. In step 1025, the description of the image is filled in based on input parameters. In step 1030, it is determined if enough invisible VRAM 405 is available to hold the image, by checking for a contiguous set of blocks in the VRAM block allocation table 450. If no, an error is returned to the application indicating not enough memory. If yes in step 1030, in step 1040, the contiguous VRAM blocks are marked allocated in the VRAM block allocation table using the window identifier. In step 1045 the lists are locked. In step 1050 the image is put into the image list. This includes putting the window identifier into the image structure, indicating that the image is not in work queue, and linking the image structure into the head of the image list. In step 1055, the parameters for the video image are then calculated, as described in step 965. In step 1050 the lists are then unlocked. Processing then continues to step 1010 as described above with reference to step 1010.

Figure 11:
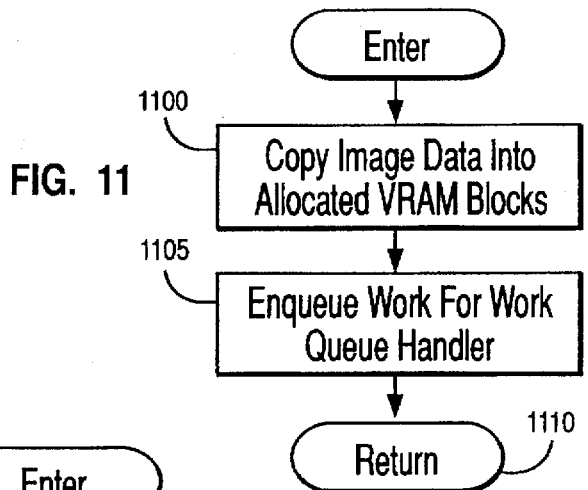
FIG. 11 is a flow diagram illustrating an 'image display' command.

FIG. 11 is a flow diagram illustrating the 'image display' command. The command has a parameter indicating the window identifier, used to choose which image to display. The command also has parameters indicating the location of the image data in main memory 120. In a first step 1100, the image data is copied into allocated blocks in invisible VRAM 405. In step 1105, the image is enqueued for the work queue handler 396, as described in step 830. Processing then returns to the application in step 1110.

The separation of 'image prepare' from 'image display' is significant. Note that image preparation involves a fair amount of checking, memory allocation and deallocation, locking of lists, etc. This is all unnecessary to simply display images sequentially in the same window, and can decrease performance. Image display is dominated by the time to copy the image data into invisible VRAM 405, while putting the image on the work queue 470 is reasonably fast. Thus separation of 'image prepare' from 'image display' can improve performance and simplify the application.

Figure 12:
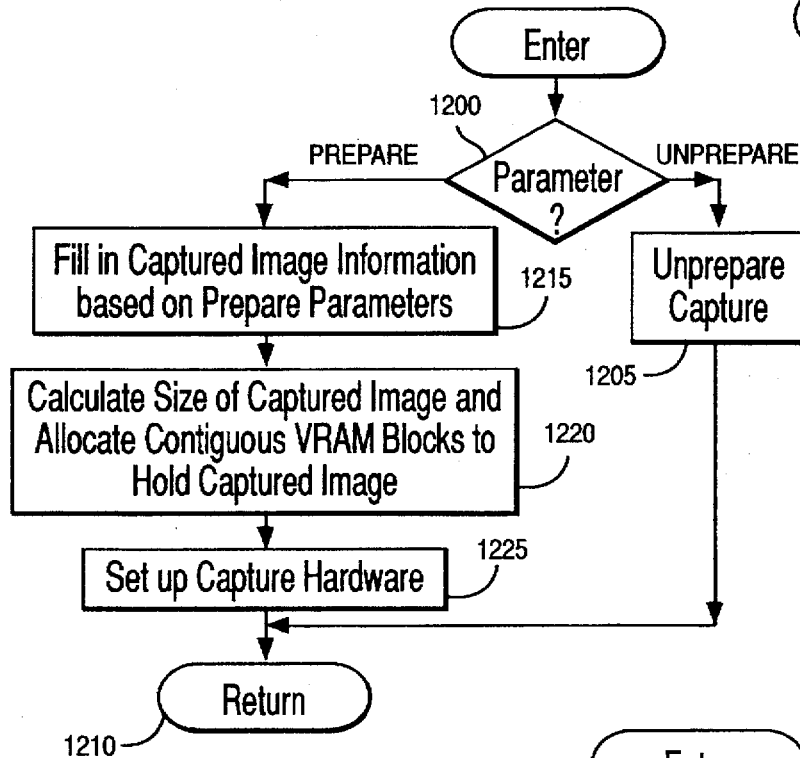
FIG. 12 is a flow diagram illustrating a 'capture prepare' command.

FIG. 12 is a flow diagram illustrating the 'capture prepare' command. A parameter indicates whether to prepare or unprepare capture. Another parameter indicates the dimensions of the image to capture. In step 1200, it is determined whether the command is prepare or unprepare. If it is unprepare, then in step 1205 captured is unprepared, as described in step 620. Processing then continues to step 1210 for return to the application. If in step 1200 it is determined the command is a prepare command, then in step 1215 the captured image information in the video data 350 is filled in based on the input parameters. In step 1220 the size of the captured image is calculated and contiguous VRAM blocks are allocated to hold the captured image by marking the VRAM block allocation table with a special identifier. In step 1225, the capture hardware (the video processor 221 and video decoder 222) is then set up. Processing then continues as described above with reference to step 1210.

Figure 13:
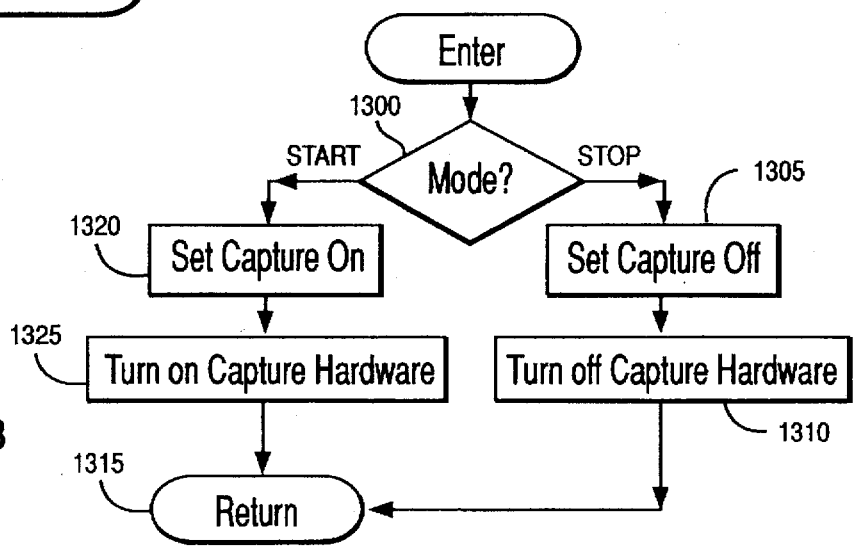
FIG. 13 is a flow diagram illustrating a 'capture control' command.

FIG. 13 is a flow diagram illustrating the 'capture control' command. A parameter indicates whether to start or stop capture. In a first step 1300, it is determined whether the mode is a stop or start. If it is determined it is stop, then in step 1305 the capture flag is set off and the capture hardware (the video processor 221 and video decoder 222) is turned off in step 1310. Processing then continues to return to the application in step 1315. If it is determined in step 1300 that the mode is start, then in step 1320 the capture flag is set on and in 1325 the capture hardware is turned on. Processing then continues as described above with reference to step 1315.

Figure 14:
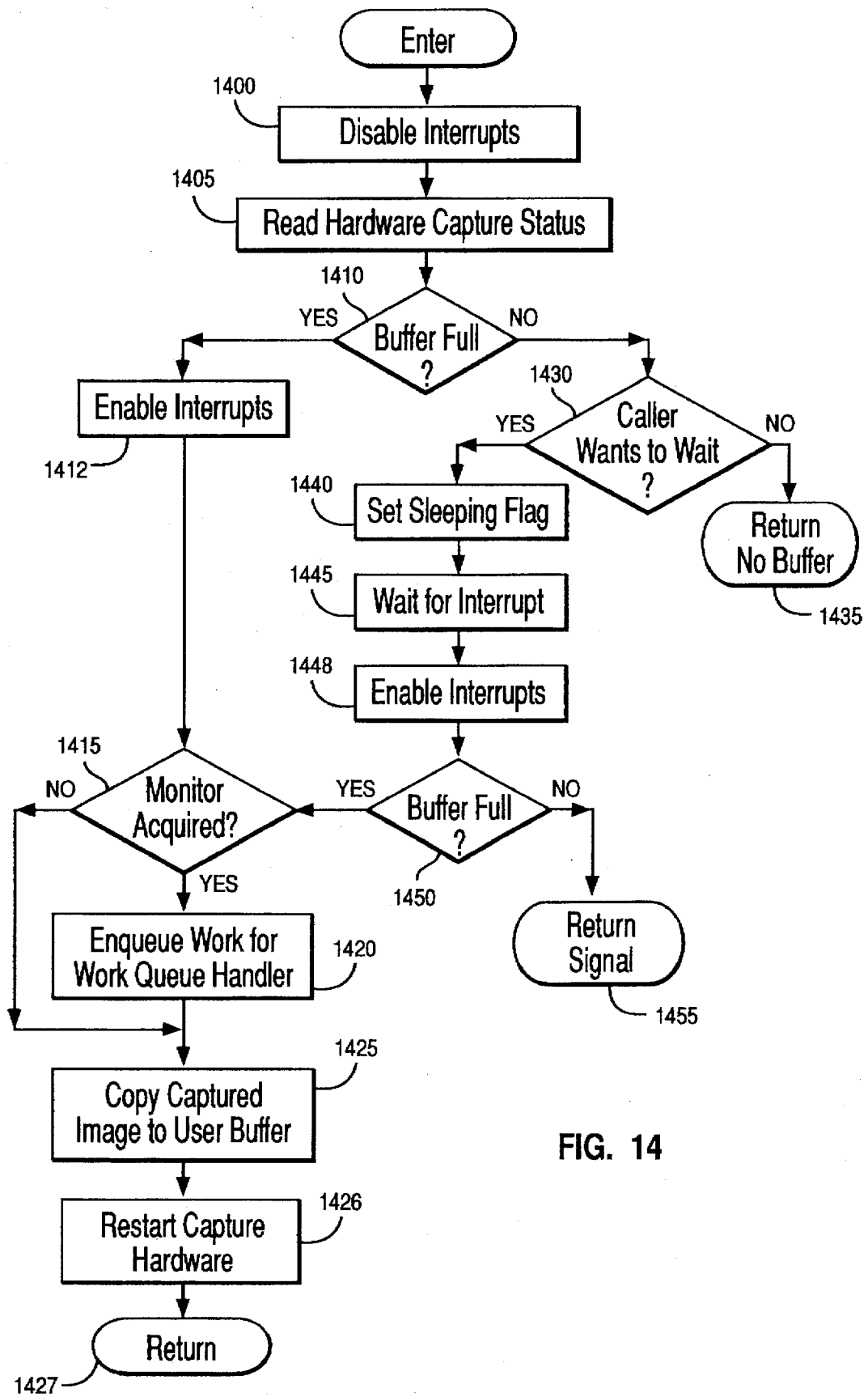
FIG. 14 is a flow diagram illustrating a 'acquire' command.

FIG. 14 is a flow diagram illustrating the 'acquire' command. A parameter indicates the address in main memory 120 into which to copy the acquired image. Another parameter indicates whether the caller wants to wait for a captured image if one is not available. In a first step 1400, the interrupts are disabled so the interrupt handler 395 can't interfere with the processing of this command. In step 1405, the video processor 221 capture status is read. In step 1410, it is determined from the capture status whether the capture buffer is full or not. If the buffer is full, then in step 1412 interrupts are enabled. In step 1415 it is determined whether the application requested monitoring of acquired images. If yes in step 1415, then in step 1420 the work is enqueued for the work queue handler as described in step 830. If no in step 1415 or after completion of step 1420, then in step 1425 the captured image is copied to the user buffer in main memory. In step 1426, the capture process is started again. Capture does not take place during the acquire activity so that the image being acquired is not (partially) overwritten by a new image. Processing then continues to step 1427 for return to the application.

If no in step 1410, then in step 1430 it is determined whether the caller wants to wait. If no in step 1420, then no image status is returned in step 1435. If yes in step 1430, then in step 1440 the sleeping flag is set. In step 1445, the system waits for a buffer full interrupt or for a signal from the operating system kernel 310 to break the wait. In step 1448, interrupts are enabled. In step 1450 it is determined whether or not the buffer is full. If yes, then processing returns as described above with reference to step 1415. If no in step 1450, then processing continues to step 1455 to return to the application that signal occurred, thus that no image is returned.

Figure 15:
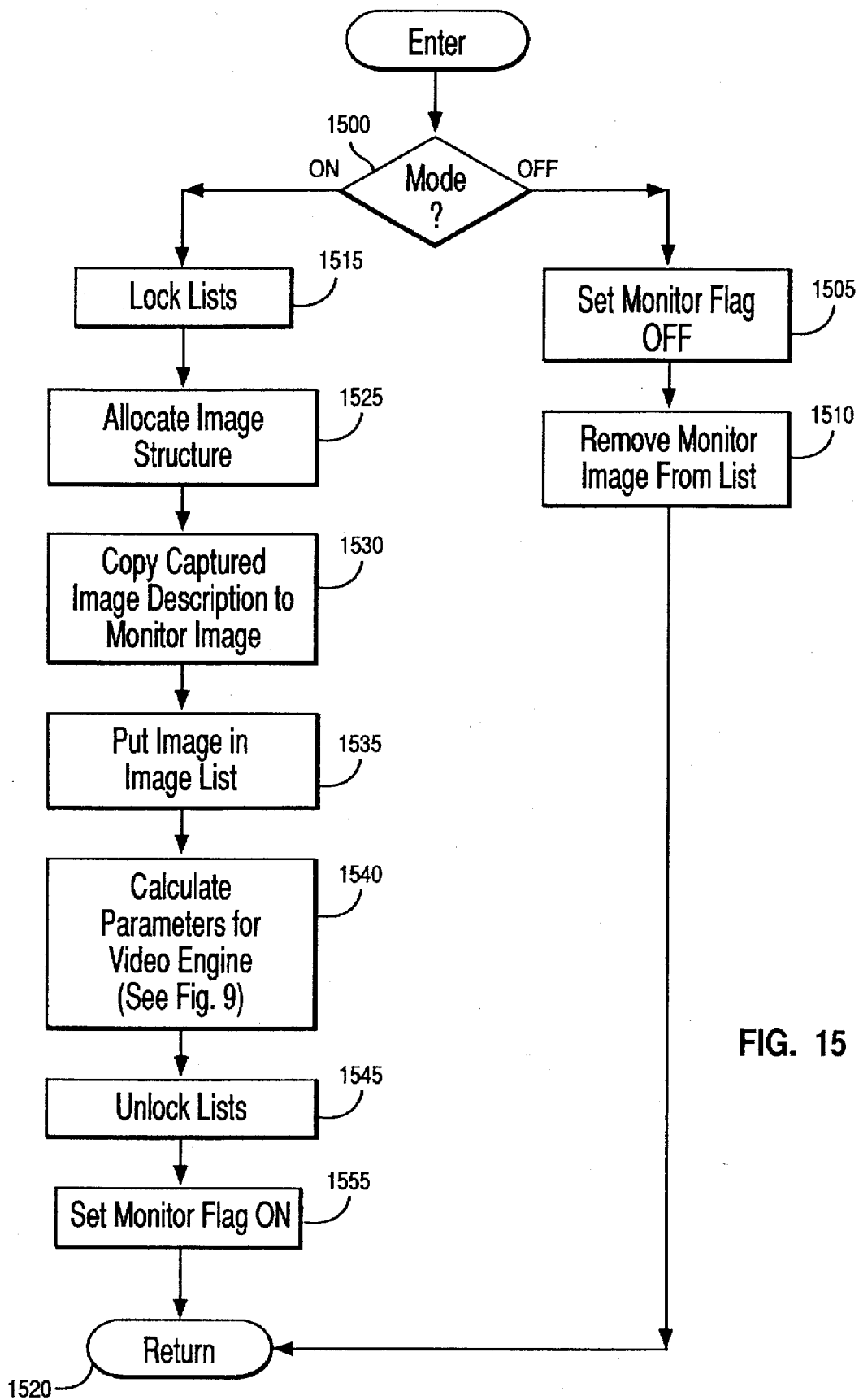
FIG. 15 is a flow diagram illustrating a 'monitor' command.

FIG. 15 is a flow diagram illustrating the 'monitor' command. A parameter indicates whether to turn monitoring off or to monitor captured images or acquired images. Another parameter is the window identifier that indicates the window in which the image can be monitored. In step 1500 it is determined whether or not the mode is on or off. If the mode is off, then in step 1505 the monitor flag is set off. In step 1510, the monitor image is removed from the image list, as described in step 630, except that no VRAM blocks are freed since capture may still be on and using the VRAM to store captured images. Processing then continues to step 1520 for return to the application.

If in step 1500 it is determined the mode is on, then in step 1515 the lists are locked. In step 1525 the image structure 415 is then allocated in memory. In step 1530 the captured image description is copied into the monitor image just allocated. Note that no additional VRAM need be allocated, since the monitor image structure simply points to the same invisible VRAM location as the captured image structure. In step 1535 the image is then put into the image list, as described in step 1040. In step 1540, the parameters are calculated for the image as described in step 965. In step 1545 the lists are then unlocked. In step 1555, the monitor flag is set to either captured or acquired, according to the input parameter. Processing continues to step 1520 described above.

Figure 16:
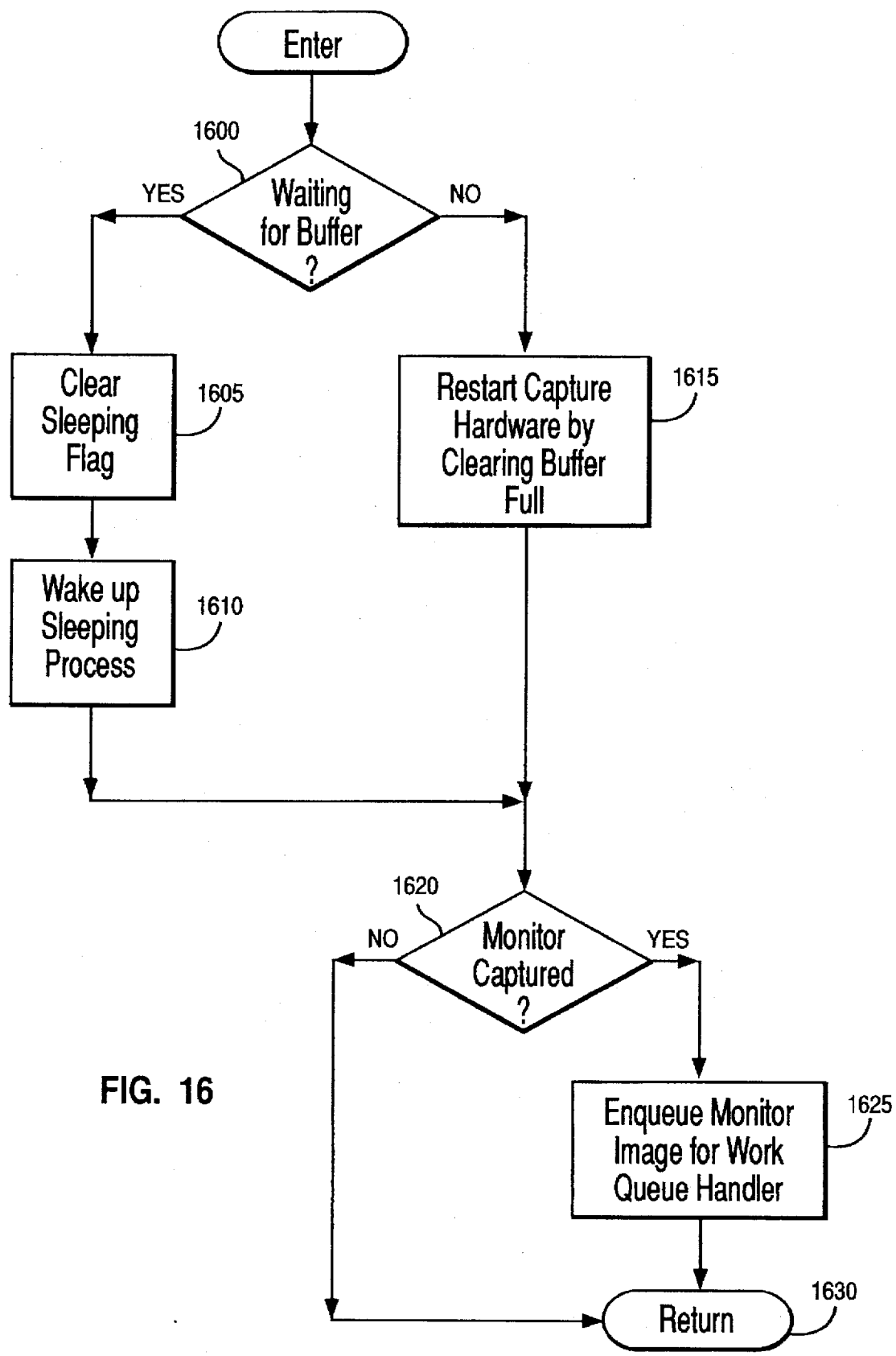
FIG. 16 is a flow diagram illustrating operation of the interrupt handler 395.

FIG. 16 is a flow diagram illustrating operation of the interrupt handler 395. The operating system kernel 310 invokes the interrupt handler each time the video processor 221 generates an interrupt indicating it has finished storing a captured image in a VRAM buffer. In a first step 1600, it is determined whether or not an application is sleeping, waiting for the capture buffer to become full. If yes, then in step 1605, the sleeping flag is cleared and in step 1610 the sleeping process is awakened. If no in step 1600, then in step 1615 the capture hardware (the video processor 221) is restarted by clearing its buffer full status. In step 1620 it is determined whether or not the application asked to monitor capture. If yes, then the monitor image is enqueued on the work queue, as described in step 830, for the work queue handler 396 to process when possible. Processing then returns from the interrupt level in step 1630.

FIG. 17 is a flow diagram illustrating operation of the work queue handler 396. In the preferred embodiment this is a kernel process. In a first step 1700, the work queue handler is waiting for some work to do. While waiting, the work queue handler may be put into a sleep mode. This is typically performed by operating system mechanisms well known in the art. The wait will be broken when the work queue handler is posted when work is enqueued (step 830), or when it is supposed to terminate during a close operation (step 655). In step 1705, it is determined whether to exit. If yes in step 1705, then in step 1710 the process exits and is then terminated. If no in step 1705, then there are images to display in the work queue, and in step 1715 the work queue is locked. In step 1720, the work queue is checked to see if it is empty. If so, in step 1725, the work queue is unlocked. Processing then returns to step 1700. In step 1720, if the work queue is not empty, processing continues with step 1730, in which the image structure 415 at the tail of the work queue is removed from the queue to be processed. In step 1735, the work queue is unlocked. In step 1740, all the parameters in the parameter list 430 for the image are put in the parameter queue for the video processor 221. The processing resumes with step 1715 as described above. The video processor acts on the parameters given to it by the work queue handler and displays in visible VRAM one or more rectangles representing the clipped and scaled image corresponding to the processed image structure.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method of storing and displaying images in a multi-tasking environment comprising the steps of:

receiving concurrently and storing a plurality of image data in a memory wherein image data to be displayed immediately are stored in a visible or displayable portion of said memory and those that are not to be displayed immediately are stored in an invisible or non-displayable portion of said memory;

storing in memory a plurality of pointers to said plurality of image data, each pointer indicating at least one of said received image data;

storing in memory a plurality of window identifiers, each window identifier identifying a window within which said image data are to be displayed; and processing each pointer for displaying on a display said image data in the window identified by the window identifier.

2. The method of claim 1 wherein the step of storing said image data includes the step of storing data associated with said image data in said invisible portion of said memory.

3. The method of claim 2 further comprising storing in memory a window clip list for each window, each window clip list being identifiable by a window identifier.

4. The method of claim 3 wherein the step of processing includes clipping image data with said window clip lists, said window clip lists being accessed using the window identifiers stored with the pointers.

5. The method of claim 4 wherein the step of storing in memory a plurality of pointers includes storing with each pointer processing parameters for the image data.

6. The method of claim 5 wherein the step of processing includes processing for each pointer the image data based on the processing parameters stored with each pointer.

7. An apparatus for storing and displaying images in a multi-tasking environment comprising:

means for receiving and storing concurrently a plurality of image data in a memory wherein image data to be displayed immediately are stored in a visible displayable portion of said memory and those that are not to be displayed immediately are stored in an invisible or non-displayable portion of said memory;

means for storing in memory a plurality of pointers to said plurality of image data, each pointer indicating at least one of said received image data;

means for storing in memory a plurality of window identifiers, each window identifier identifying a window within which said image data are to be displayed; and means for processing each pointer for displaying on a display said image data in the window identified by the window identifier.

8. The apparatus of claim 7 wherein said means for storing said image data includes means for storing data associated with said image data in said invisible portion of said memory.

9. The apparatus of claim 8 further comprising means for storing in memory a window clip list for each window, each window clip list being identifiable by a window identifier.

10. The apparatus of claim 9 wherein the means for processing includes clipping image data with said window clip lists, said window clip lists being accessed using the window identifiers stored with the pointers.

11. The apparatus of claim 10 wherein the means for storing in memory a plurality of pointers includes storing with each pointer processing parameters for the image data.

12. The apparatus of claim 11 herein the means for processing includes processing for each pointer the image data based on the processing parameters stored with each pointer.

13. A data processing system comprising:

a first memory for storing data to be processed;

a processor for processing said stored data;

means for concurrently receiving and storing a plurality of image data in a second memory wherein image data to be displayed immediately are stored in a visible or displayable portion of said second memory and those that are not to be displayed immediately are stored in an invisible or non-displayable portion of said second memory;

means for storing in said memory a plurality of pointers to said plurality of image data, each pointer indicating at least one of said received image data;

means for storing in said second memory a plurality of window identifiers, each window identifier identifying a window within which said image data are to be displayed; and means for processing each pointer for displaying on a display said image data in the window identified by the window identifier.

14. The data processing system of claim 13 further comprising means for storing in said second memory a window clip list for each window, each window clip list being identifiable by a window identifier.

15. The data processing system of claim 14 wherein the means for processing includes clipping image data with said window clip lists, said window clip lists being accessed using the window identifiers stored with the pointers.

16. The data processing system of claim 15 wherein the means for storing in said second memory a plurality of pointers includes storing with each pointer processing parameters for the image data.

17. The data processing system of claim 16 wherein the means for processing includes processing for each pointer the image data based on the processing parameters stored with each pointer.

18. A computer program product stored on a computer readable medium and executable by a processor for storing and displaying images in a multi-tasking environment comprising:

means for concurrently receiving and storing a plurality of image data in a memory wherein image data to be displayed immediately are stored in a visible or displayable portion of said memory and those that are not to be displayed immediately are stored in an invisible or non-displayable portion of the memory;

means for storing a plurality of pointers to said plurality of image data, each pointer indicating at least one of said received image data;

means for storing in said memory a plurality of window identifiers, each window identifier identifying a window within which said image data are to be displayed; and means for processing each pointer for displaying said image data in the window identified by the window identifier.

19. The computer program product of claim 18 further comprising means for storing a window clip list for each window, each window clip list being identifiable by a window identifier.

20. The computer program product of claim 19 wherein the means for processing includes clipping image data with said window clip lists, said window clip lists being accessed using the window identifiers stored with the pointers.

21. The computer program product of claim 20 wherein the means for storing a plurality of pointers includes storing with each pointer processing parameters for the image data.

22. The computer program product of claim 21 wherein the means for processing includes processing for each pointer the image data based on the processing parameters stored with each pointer.

* * * * *